United States Patent [19]

Poor

[11] Patent Number: 5,045,098
[45] Date of Patent: Sep. 3, 1991

[54] BAG SEPARATOR

[75] Inventor: James C. Poor, East Granby, Conn.

[73] Assignee: The Spencer Turbine Company, Windsor, Conn.

[21] Appl. No.: 566,554

[22] Filed: Aug. 13, 1990

[51] Int. Cl.$^5$ .............................................. B01D 46/04
[52] U.S. Cl. ........................................ 55/300; 55/304; 55/378
[58] Field of Search .................. 55/300, 304, 305, 372, 55/378

[56] References Cited

U.S. PATENT DOCUMENTS

| | | | |
|---|---|---|---|
| 823,117 | 10/1906 | Beth | 55/304 |
| 842,529 | 1/1907 | Dittmar . | |
| 1,056,033 | 3/1913 | Kubosch | 55/300 X |
| 1,110,344 | 9/1914 | Preston . | |
| 1,856,133 | 3/1927 | McClatchie . | |
| 2,014,298 | 9/1935 | Schneible | 55/304 |
| 2,714,426 | 8/1955 | White | 55/305 |

Primary Examiner—Charles Hart
Attorney, Agent, or Firm—McCormick, Paulding & Huber

[57] ABSTRACT

A cyclone separator having a manually operable bag shaker mechanism including a vertically oriented shaker rod supported on the top wall of the separator housing for vertical reciprocal and rotational movement relative to the separator housing. A filter bag disposed within the housing is suspended from a shaker bar mounted in fixed position on the lower end of the shaker rod. A compression spring received on the shaker rod acts between the top wall and a knob secured in fixed position to the upper end of the shaker rod. When the spring is compressed and released in its compressed position in response to a downwardly directed force on the knob a plurality of shaking cycles are produced which dislodges dust and other caked particulate material from the filter bag. The knob may be turned in either direction about its axis to twist the filter bag and thereby dislodge material from it.

11 Claims, 1 Drawing Sheet

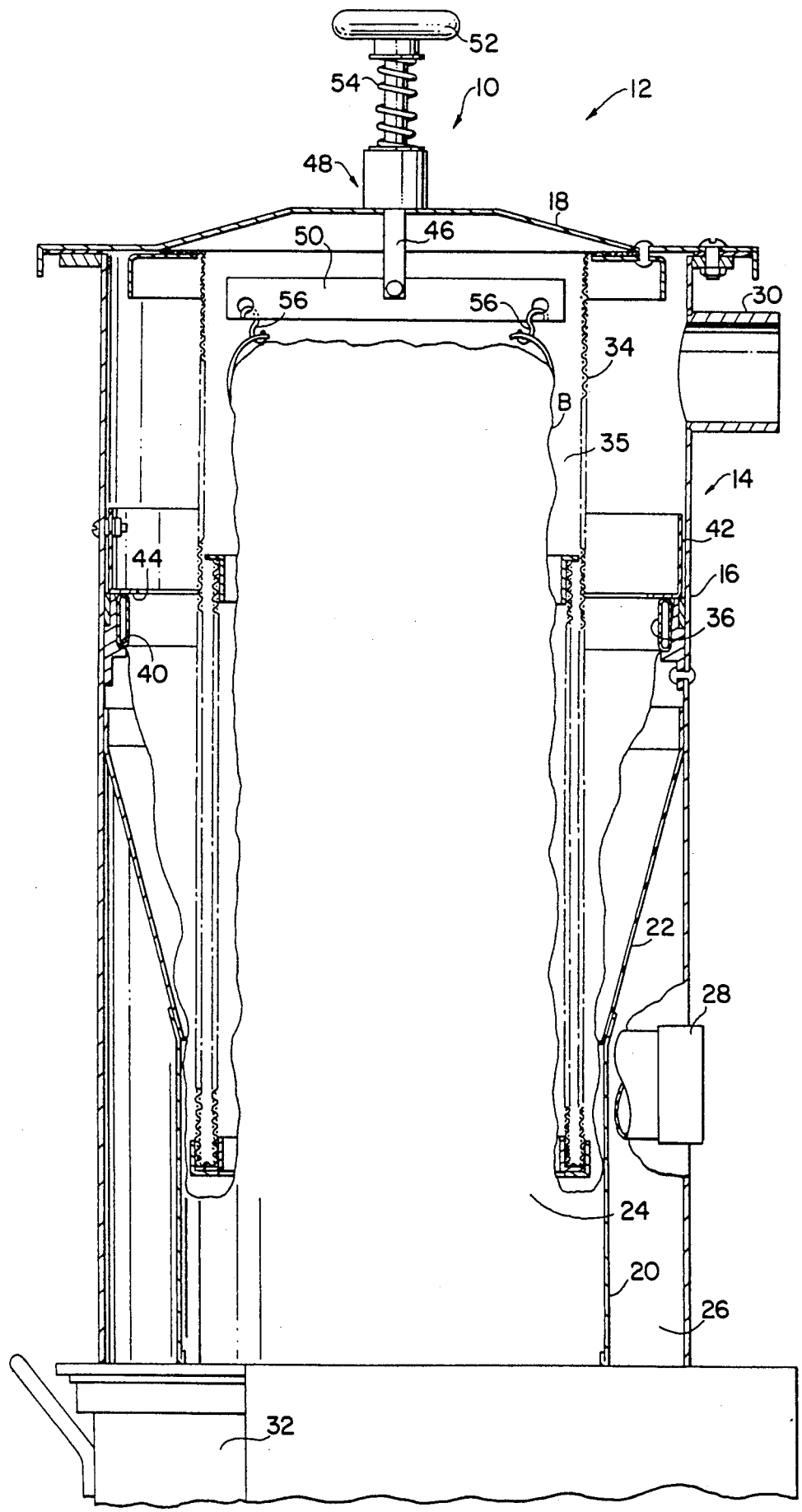

BAG SEPARATOR

BACKGROUND OF THE INVENTION

This invention relates in general to bag separators and deals more particularly with improvements in a separator of the type having a manually operated bag shaker mechanism. In a bag separator of the aforedescribed generally type, the shaker mechanism must be operated periodically to dislodge dust or other caked particulate material from the filter bags disposed within the separator.

Heretofore, various types of manually operated bag shakers have been provided and typical examples of such mechanisms are found in the following U.S. Pat. Nos. 842,529 1,110,344 1,856,133

Manually operated shaker mechanisms heretofore available generally operate in response to manually applied push-pull or rotary motion and require substantial expenditure of time and energy.

It is the general aim of the present invention to provide an improved manually operable bag shaker mechanism which may be operated with minimal expenditure of time and energy.

SUMMARY OF THE INVENTION

In accordance with the present invention, a bag separator has a separator housing including top and side walls, a filter bag, and a bag supporting structure which includes an improved manually operable bag shaker mechanism. The shaker mechanism comprises an axially vertically disposed shaker rod which extends through the top wall, mounting means for supporting the shaker rod for axially vertical reciprocal movement relative to the separator housing, a bag support member mounted on the lower end portion of the shaker rod, means for attaching the one filter bag to the bag support member, a knob attached in fixed position to the upper end of said shaker rod externally of said housing, and spring biasing means for urging the shaker rod in an upward direction, whereby a plurality of bag shaking cycles are produced in response to a single downward thrust and release of the knob.

BRIEF DESCRIPTION OF THE DRAWING

The drawing comprises a fragmentary vertical axial sectional view through a bag separator embodying the present invention.

DETAILED DESCRIPTION OF PREFERRED EMBODIMENT

Turning now to the drawing, a manually operable bag shaker embodying the present invention and indicated generally at 10 is illustrated and described with reference to a bag separator designated generally by the reference numeral 12. The illustrated separator 12 is a cyclone separator and has a cylindrical housing, indicated generally at 14, defined, in part, by a cylindrical side wall 16 and a domed top wall 18. Preferably, and as shown, the top wall 18 is bolted or otherwise releasably secured to the side wall 16 to provide a removable closure for the upper end of the housing 14. The housing also has a cylindrical inner wall 20 at its lower end and a conical transitional wall 22 connected between the upper end of the inner wall 20 and the side wall 16, substantially as shown. Thus, the inner wall 20 and the transitional wall 22 cooperate with the side wall 16 to divide the interior of the housing into two chambers which include a main chamber 24 and an annular chamber 26 surrounding the lower portion of the main chamber. An inlet conduit 28 communicates tangentially with the annular chamber 26. An outlet coupling 30 communicates with the upper end portion of the main chamber 24. A removeable dust bin 32 disposed in sealing engagement with the lower end of the housing provides a closure for the lower end. The housing further includes a cylindrical perforated wall or screen 34 disposed within the main chamber 24 and depending from the top wall 18, substantially as shown. The perforated wall 34 defines a downwardly open secondary chamber 35 within the main chamber 24.

In the illustrated embodiment a single filter bag, indicated by the letter B, is preferably employed and is suspended in a downwardly open position from the bag shaker 10, and within the secondary chamber 35 as will be hereinafter further discussed. The open end of the bag B is turned outwardly and upwardly over the lower end of perforated wall 34, substantially as shown. The open or terminal end of the bag B is attached to a cylindrical bag ring 36 which defines an upwardly open portion of the filter bag B surrounding the perforated wall or screen 34. A bag retainer ring 38 secured in fixed position to the inner peripheral surface of the cylindrical side wall 16 defines an upwardly facing annular seating surface 40 upon which the bag ring 36 is seated. The bag ring 36 is further secured by an annular locking ring 42 which is disposed in engagement with the inner peripheral surface of the side wall 16 and defines a downwardly facing annular bearing surface 44 which cooperates with the upwardly facing annular seating surface 40 to clamp the bag ring therebetween. A plurality of fasteners releasably secure the locking ring 42 to the sidewall 16.

Considering now the shaker mechanism 10 in further detail, the illustrated mechanism includes a shaker rod 46 and a bushing assembly, indicated generally at 48, mounted in fixed position on the upper end of the top wall 18 receiving the shaker rod therethrough. The bushing assembly supports the shaker rod for axially vertical reciprocal movement and rotary movement relative to the shaker housing 14.

A horizontally disposed bag support member or shaker bar 50 is mounted in fixed position to the lower end of the shaker rod by a rivet or the like. The shaker bar extends outwardly in radially opposite directions from the shaker rod, substantially as shown and has apertures formed in its opposite ends. The shaker mechanism further includes a knob 52 mounted in fixed position to the upper end of the shaker rod 46 externally of the housing 12. The shaker rod is urged in an upward direction by a compression spring 54 received on the shaker rod 46 and acting between the bushing assembly and the knob 52. Preferably, and as shown, washers are received on the shaker rod adjacent opposite ends of the compression spring 54.

As previously noted, the filter bag B is carried by and suspended from the shaker bar 50. More specifically, the one filter bag B is attached to the shaker bar 50 by a pair of S hooks 56,56 received in the apertures at the opposite ends of the shaker bar. The S hooks are respectively connected to tabs or ears sewn or otherwise suitably attached to the filter bag B, substantially as shown.

The compression spring 54 is selected to provide an upwardly directed biasing force which counteracts the combined weight of the filter bag B, the bag attachments, the shaker bar, the knob and dust or other contaminates adhered to the bag side wall.

When a single downwardly directed force is applied to the knob 52 to compress the spring 54 and the knob 52 is thereafter released while the spring is in its compressed position a plurality of axially vertical reciprocal movements are applied to the bag B to shake dust and dislodge cake particulate material from it. If desired, a twisting force may also be applied to the filter bag B by rotating the knob in either or both directions about its axis. The material dislodged from the filter bag B drops into the collector or bin 32 below the separator housing 14 for periodic removal. Thus, it will be apparent that the shaker mechanism of the present invention permits the bag shaking operation to be rapidly performed with a minimum of expended energy.

I claim:

1. In a bag separator having a housing including a top wall and a cylindrical side wall defining a main chamber, a filter bag, and a bag shaker mechanism supporting the filter bag within the housing, the improvement wherein said housing includes a cylindrical perforated wall coaxially depending from said top wall and defining a downwardly open secondary chamber within said main chamber, said filter bag being supported within said secondary chamber and having a lower open end portion turned outwardly and upwardly over the lower end portion of said perforated wall, and means for attaching said open end to the inner peripheral surface of said side wall in upwardly spaced relation to said lower end of said perforated wall and in surrounding relation to said perforated wall, and said bag shaker mechanism includes an axially elongate vertically disposed generally cylindrical shaker rod extending through said top wall, mounting means supporting said shaker rod for vertically reciprocal and rotational movement relative to said housing and including a cylindrical bushing assembly mounted in fixed position on said top wall and slidably receiving said shaker rod therethrough, means for supporting said filter bag in depending position from said shaker rod and including a shaker bar mounted in fixed position on the lower end of said shaker rod and extending in radially opposite directions therefrom, said shaker bar having openings in the opposite ends thereof, means for attaching said filter bag to the shaker bar and including a pair of fasteners respectively received in said openings and connected to the filter bag, a knob attached in fixed position to the upper end of the shaker rod externally of the separator housing, and a compression spring received on said shaker rod and acting between said top wall and said knob to urge said shaker rod in an upwardly direction relative to said housing, whereby a single downward thrust and release of said knob produces a plurality of vertically reciprocal bag shaking cycles.

2. In a bag separator having a housing including a top wall and a cylindrical wall, at least one filter bag, a bag shaker mechanism supporting the one filter bag within said housing and having an axially elongate vertically disposed shaker rod extending through said top wall, mounting means supporting said shaker rod for vertical reciprocation relative to said housing, a bag support member mounted on the lower end portion of the shaker rod, means for attaching the one filter bag to said bag support member, a knob attached in fixed position on the upper end of said shaker rod externally of said housing, and spring biasing means for urging said shaker rod in an upward direction, whereby a plurality of vertically reciprocal bag shaking cycles are produced in response to a single downward movement and release of said knob, the improvement comprising means for securing an open end of the filter bag to the housing and including a cylindrical bag ring secured to the filter bag and defining an open end of the filter bag, a bag retainer ring secured in fixed position to the inner peripheral surface of said cylindrical side wall and defining an upwardly facing annular seating surface, an annular locking ring disposed in engagement with the inner peripheral surface of said cylindrical side wall and defining a downwardly facing annular bearing surface for cooperating with said upwardly facing annular seating surface to clamp said bag ring therebetween, and means for releasably securing said locking ring to said side wall.

3. In a bag separator having a housing including top and side walls generally defining a main chamber, a filter bag, and a bag shaker mechanism supporting the filter bag within the housing, the improvement comprising a perforated wall depending from said top wall and defining a downwardly open secondary chamber within said main chamber, said filter bag being supported within said secondary chamber and having a lower open end portion turned outwardly and upwardly over the lower end portion of said perforated wall, and means for attaching said open end to the inner peripheral surface of said side wall in upwardly spaced relation to said lower end of said perforated wall and in surrounding relation to said perforated wall including a bag retainer ring secured in fixed position to the inner peripheral surface of said housing side wall, a bag ring defining an open end of said filter bag and seated upon said bag retainer ring, and a locking ring seated on said bag ring and cooperating with said bag retainer ring to secure said bag ring in fixed position relative to said housing.

4. In a bag separator as set forth in claim 3 the further improvement wherein said housing includes a transitional wall diverging downwardly from said side wall in surrounding relation to said perforated wall and said lower open end portion is turned upwardly over the lower end portion of said perforated wall and extends upwardly between said perforated wall and said transitional wall.

5. In a bag separator as set forth in claim 3 the further improvement wherein said bag shaker mechanism comprises an axially elongate vertically disposed shaker rod extending through said top wall, mounting means supporting said shaker rod for vertical reciprocation relative to said housing, a bag support member mounted on the lower end portion of the shaker rod, means for attaching said filter bag to said bag support member, a knob attached in fixed position on the upper end of said shaker rod externally of said housing, and spring biasing means for urging said shaker rod in an upward direction, whereby a plurality of vertically reciprocal bag shaking cycles are produced in response to a single downward movement and release of said knob.

6. In a bag separator as set forth in claim 3 the further improvement wherein said mounting means comprises means supporting said shaker rod for rotary motion relative to said housing.

7. In a bag separator as set forth in claim 6 the further improvement wherein said mounting means comprises a bearing assembly mounted on said top wall and including a bushing supporting said shaker rod for reciprocal sliding and rotary movement relative to said housing.

8. In a bag separator as set forth in claim 3 the further improvement wherein said biasing means compression spring received on said shaker rod and acting between said top wall and said knob.

9. In a bag separator as set forth in claim 8 the further improvement wherein said bag support member comprises a shaker bar mounted in fixed position to the lower end of the said shaker rod within said separator housing and extending in radially opposite directions from said shaker rod.

10. In a bag separator as set forth in claim 9 the further improvement wherein said shaker bar has openings through the opposite ends thereof and said means for attaching the one filter bag comprises a pair of fasteners connected to said one filter bag and to said shaker bar through said openings.

11. In a bag separator as set forth in claim 10 the further improvement wherein said fasteners comprise S hooks.

* * * * *